Aug. 11, 1931.    F. B. TOWNSEND    1,818,511
BASKET HANDLE
Filed Oct. 22, 1929

Inventor,
Frank B. Townsend,
By Siggers & Adams
Attorneys

Patented Aug. 11, 1931

1,818,511

UNITED STATES PATENT OFFICE

FRANK B. TOWNSEND, OF PENN YAN, NEW YORK, ASSIGNOR OF ONE-HALF TO JOHN E. McMATH, OF PENN YAN, NEW YORK

BASKET HANDLE

Application filed October 22, 1929. Serial No. 401,450.

This invention relates to basket handles and, among other objects, aims to provide a wire handle of the character shown in my copending application, Ser. No. 298,065, filed August 7, 1928, and having novel means positively to prevent the ear-engaging hooks from being accidentally dislodged from the basket ears, the construction and arrangement being such as to enable the hooked ends to be inserted very easily.

In the accompanying drawings, showing one illustrative embodiment of the invention:

Wire handles for fruit and vegetable baskets are usually manufactured and assembled on the baskets either after they are filled with fruit or before they are taken to the field. The attaching ends of the handles are usually hook-shaped to engage suitable basket ears or eyes and provision is made for holding down the basket lid when it is shipped. Considerable difficulty has been experienced in using the common types of detachable handles now being supplied because the hooked ends are very easily dislodged from their attaching ears or eyes when the baskets are being handled prior to and during their shipment. It is therefore the aim of this invention to provide a relatively simple and cheap wire handle that cannot be accidentally dislodged from the basket, and, incidentally, one that can easily be applied to the attaching ears or eyes.

Referring particularly to the drawings, the handle is there shown as being applied to a berry basket 10 having opposed attaching eyes in the form of wire staples 11 straddling the upper edges of the reinforcing bands 12. A notched lid or cover 13 of the usual type, is applied to the basket and the notches straddle the staples so as to prevent longitudinal displacement.

Figure 1:
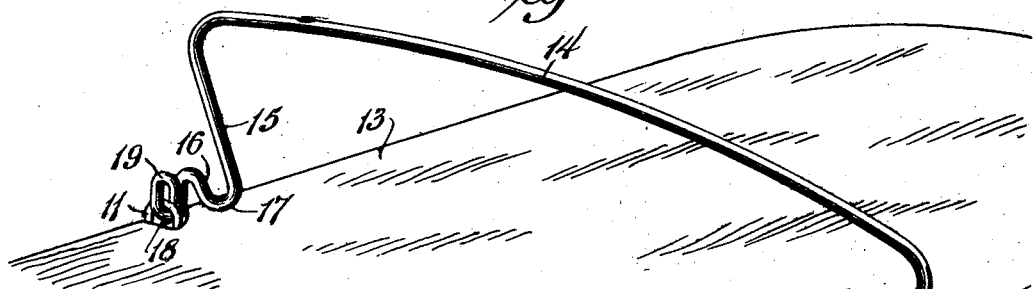
Fig. 1 is a fragmentary perspective view showing the preferred form of handle applied to a basket.
Figure 2:
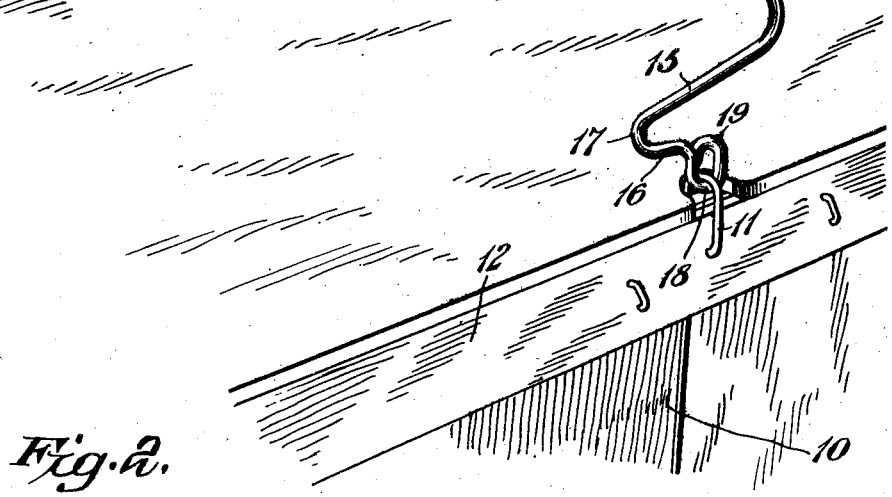
Fig. 2 is a fragmentary top plan view of the handle assembly shown in Fig. 1.
Figure 3:
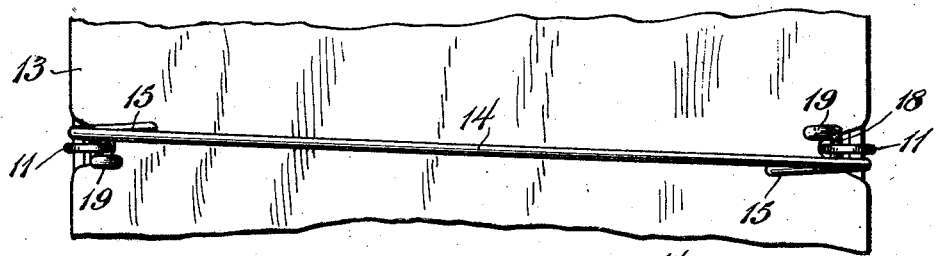
Fig. 3 is a fragmentary sectional view through the basket and one end of the handle applied thereto.
Figure 4:
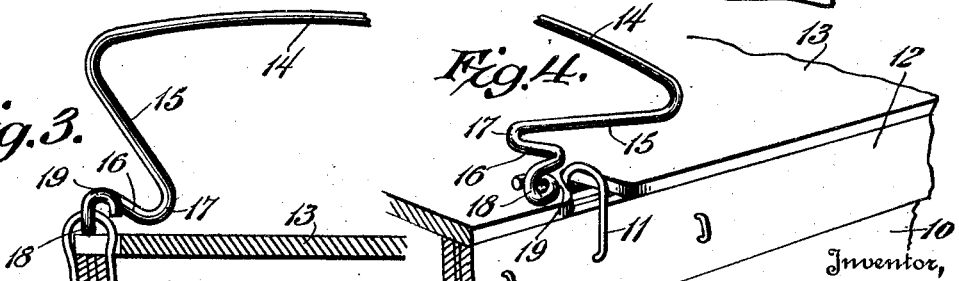
Fig. 4 is a fragmentary perspective view showing one end of the handle separated from its staple or eye.

The improved wire handle is here shown as comprising a bail member 14 having downwardly and inwardly inclined arms 15 presenting at their lower ends outwardly bent portions 16 overlying the basket lid, the arrangement being such that the lid may be snapped into place by first inserting one edge with its notching engaging the attaching staple on one side and pressing down on the other edge. The bent portions 16, as will be seen in Fig. 1, present rounded shoulders 17 over which the notched portions of the lid are adapted to be snapped and guided into place.

In this example, the terminals of the handle are shown as being bent downwardly and then upwardly to provide U-shaped hooks 18 lying in the same plane as the basket rim and at right angles to the plane of the attaching ears or staples. Herein, one hook is formed on one side of the handle and the other on the opposite side so that the hooked ends are threaded into the staples from opposite sides while the handle is held across the basket in a substantially horizontal plane, being shifted from one position to another. However, it is not indispensable that the hooks shall be on opposite sides of the handle. Obviously, both of them may be on the same side.

To prevent either hooked end from being disengaged from its staple or attaching ear, the extreme ends of the handle are shown as being reversely bent in a plane at right angles to the staple engaging hooks to provide substantially U-shaped hook portions 19. These hook portions are herein bent inwardly; but, conceivably, they may be bent outwardly to serve the same purpose. The idea is to have the hooks so shaped and arranged as to engage one leg of each staple when the handle is swung down over the lid and displaced or pushed longitudinally of the basket. It will be noted that the arms of the handle are sprung slightly inwardly so that the hooks 19 cannot find the way back through the staples. In fact, a filled basket will bulge out at the sides sufficiently to cause the hooked ends of the handle to engage the staples adjacent to their inner legs. The handle cannot be dislodged by pressing downwardly on it when the lid is in place because the lid will act as a stop for the bent shoulders.

From the foregoing description, it will be seen that the improved handle may be made very easily of a single piece of wire, and is very easy to apply to the ears or staples on a basket before the lid is put in place. Moreover, the handle can swing down against the lid so that filled baskets may be stacked lengthwise on top of each other. When the handle is thus swung down, the hook 19 on one end will engage the inner leg of its staple and the outwardly bent arm 16 will engage the inner leg of the other staple so that any displacement of the handle longitudinally of the basket will not disengage either hooked end from its staple.

Obviously, the present invention is not restricted to the particular embodiment thereof herein shown and described.

What is claimed is:

1. In combination with a fruit basket having a pair of handle-receiving eyes on opposite sides thereof and extending transversely above the upper edges of the basket rim, a wire handle presenting U-shaped eye-engaging hooks lying in planes at right angles to the planes of said eyes and adapted to be freely inserted in said eyes; and terminal hook members above said eye-engaging hooks arranged to engage one side of said eyes when said handle is swung downwardly in either direction and displaced longitudinally of the basket.

2. In combination with a fruit basket having a pair of transversely arranged handle-receiving eyes extending across the upper edges of the rim, a wire bail-shaped handle having hooked ends lying in planes at right angles to the planes of said eyes; and downwardly bent hook-shaped terminals on said eye-engaging hooks constructed and arranged to engage said eyes and prevent accidental dislodgment of the handle from the eyes.

3. In combination with a fruit basket having transverse handle-receiving eyes on its opposite sides and above its upper edge, a bail-shaped wire handle having downwardly and inwardly bent arms overlying the basket; a pair of U-shaped eye-engaging hooks formed on the handle and lying in planes at right angles to the plane of said eyes, one hook being formed on one side of the handle and the other hook being formed on the opposite side; and reversely bent terminals on said hooks to engage said eyes and prevent accidental dislodgment of the handle.

4. A wire handle for fruit baskets and the like comprising a bail-shaped portion presenting downwardly and inwardly inclined arms; eye-engaging hooks on said arms lying in planes at right angles to the plane of said handle; and reversely bent hook-shaped terminals lying in planes at right angles to the plane of said first-named hooks adapted to cooperate with basket eyes to prevent accidental dislodgment of the handle therefrom.

5. A wire handle for fruit baskets and the like having open substantially U-shaped eye-engaging hooks lying in planes substantially at right angles to the plane of the handle; and means integral with one end of each eye-engaging hook constructed and arranged to interlock with a basket eye and prevent accidental dislodgment of the hooks therefrom when the handle is displaced in any direction.

In testimony, that I claim the foregoing as my own, I have hereto affixed my signature.

FRANK B. TOWNSEND.